Dec. 21, 1965     M. W. FORTH     3,224,387

DIE STRUCTURE FOR WAFERING OR PELLETING MACHINES

Original Filed April 13, 1961     2 Sheets-Sheet 1

*INVENTOR.*
MURRAY W. FORTH

Dec. 21, 1965          M. W. FORTH          3,224,387
DIE STRUCTURE FOR WAFERING OR PELLETING MACHINES
Original Filed April 13, 1961          2 Sheets-Sheet 2
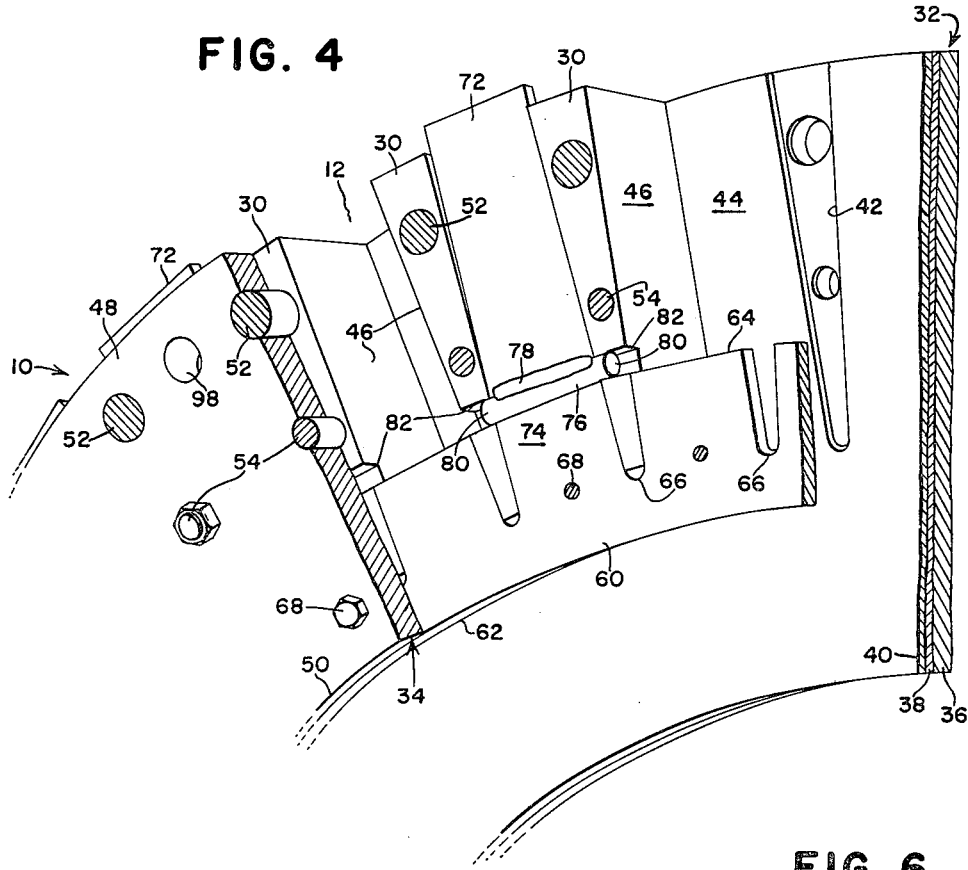
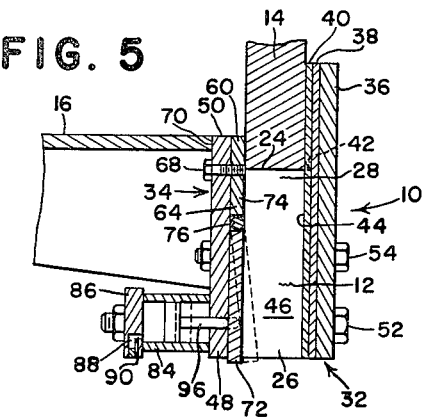
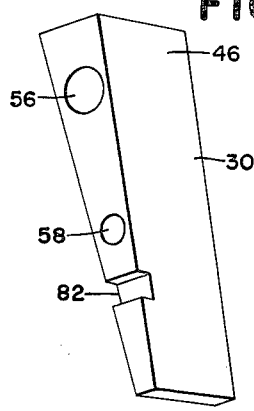
INVENTOR.
MURRAY W. FORTH

United States Patent Office 3,224,387
Patented Dec. 21, 1965

3,224,387
DIE STRUCTURE FOR WAFERING OR
PELLETING MACHINES
Murray W. Forth, Moline, Ill., assignor to Deere &
Company, Moline, Ill., a corporation of Delaware
Continuation of application Ser. No. 102,822, Apr. 13,
1961. This application June 18, 1964, Ser. No. 377,457
23 Claims. (Cl. 107—14)

This application is a continuation of copending application Ser. No. 102,822, filed April 13, 1961, now abandoned. The invention relates to die structure for pelleting or wafering machines and has for its principal object the provision of improved die structure featuring a novel arrangement of die blocks and adjustable walls for the die openings.

In a machine of the character described, it is common to provide a die structure having therein a plurality of die openings through which material is extruded in pellet or wafer form, the object being to compress or condense the material into relatively small cakes, pellets or wafers which are more easily handled for transport, storage and ultimate disposition. Materials of this type and machines and processes for producing same are finding increasing favor in the agricultural field in the pelleting or wafering of hay and other forage, wherein the problems encountered are somewhat different from those met by designers in the field in which granular, pulverulent and relatively dry materials are handled.

In the design and production of a machine in which the die means comprises one or more annular members, one of the problems is to fabricate an annular die structure in which the components are structurally strong enough to withstand the relatively high pressures encountered, while at the same time eliminating unnecessary expense. Another problem resides in the desirability of providing means for varying the sizes of the die openings by the provision of adjustable or movable walls therein. According to the present invention, structural strength is accomplished by interlocking or key means on the several die blocks and the associated side members. It is another object to provide for each die opening an adjustable wall element which is hingedly mounted in a novel manner; specifically, by providing on the wall element a hinge having portions received in notches or recesses in the associated die blocks or spacers. As an overall object, the invention provides an improved and low-cost die structure which may be readily produced, assembled and disassembled.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 4 is an enlarged fragmentary perspective, with portions broken away and shown in section, as would be seen when looking in the direction of the arrow bearing the encircled numeral 4 in FIG. 4.

FIG. 5 is a section, drawn to an enlarged scale, as seen along the line 5—5 of FIG. 1.

FIG. 6 is a perspective of a die block removed from the structure of FIG. 4.

Figure 1:
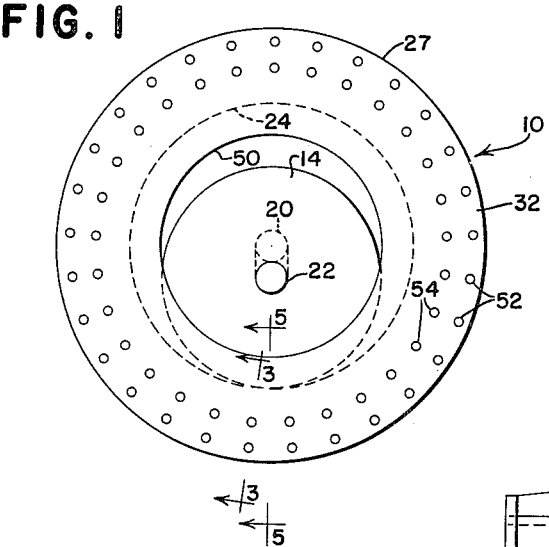
FIG. 1 is an end view of a typical machine in which the invention may be embodied.

The die structure is indicated in its entirety by the numeral 10 and in this instance takes the form of an annulus having a plurality of radial die openings 12 through which material is extruded radially outwardly by an inner die or press wheel 14. The die structure may be rigidly secured to an elongated cylindrical housing 16 to one end of which material is fed in the first instance to be conveyed axially of the housing as by an auger 18. This auger is mounted on a central shaft 20 which has an eccentric or crank portion 22 on which the press wheel 14 is journaled. Thus, the wheel 14 is eccentric to the inner circle 24 of the annulus or die structure 10, leaving a crescent-shaped opening which receives material from the auger 18. As the shaft 20 turns, it carries the press wheel 14 around with it, the outer periphery of the press wheel of course rolling on the circle 24 of the annulus so as to compress and ultimately extrude material radially outwardly through the die openings 12, the outer or outlet ends 26 of which exit at or lie generally on an outer circle 27 which may be regarded as the outer peripheral edge of the annulus or die structure 10. It will be understood of course that the inner circle 24 is not complete, because it is interrupted by the inlet ends 28 of the respective die openings 12. However, such circle is shown in dotted lines in FIG. 1 by way of representation only to orient the relationship of the inner periphery of the annulus 10 to the press wheel 14. Any suitable means may be provided for collecting the wafers or pellets extruded through the outlet or discharge ends 26 of the openings 12, but since such means is not material here, it has not been shown.

The several die openings in the annulus 10 are established by the provsion of a plurality of uniformly circumferentially spaced die blocks or spacers 30 rigidly secured between opposite plate structures or coaxial spaced apart side means designated in their entireties by the numerals 32 and 34.

As already stated, the present die structure follows accepted practice in the sense that it is an annulus. However, the die structure could be otherwise arranged and accordingly the description, although employing terms consistent with the specific illustration used here, must be taken as representative and not limiting.

The wall structure or side member or means 32 is here made up of a relatively heavy outer plate 36 and a pair of somewhat thinner inner plates 38 and 40, the laminated structure thus accomplished being secured by appropriate spot welding or other means. The innermost plate 40 is cut out to provide V-shaped notches 42 and these notches in conjunction with the intervening portions of the adjacent plate 38 establish recesses for respectively receiving the proximate side portions of the die blocks 30 which, as best shown in FIGS. 4 and 6, are also of V-shape so that their inner faces—that is their faces that circumferentially oppose each other—will be parallel to an associated radius of the annulus. In the present case, each opening 12 is of quadrilateral—here rectangular—section or cross sectional shape, one wall of each such opening being provided by the intervening wall portion 44 on the inner plate 40, other wall portions being provided by the circumferentially spaced and opposed faces 46 of the blocks and a fourth wall being provided by structure to be presently described.

The other wall structure or side member 34 comprises a relatively heavy outer plate 48 which has an outside diameter substantially equal to that of the structure 32 and is in the form of a ring having an inside diameter such as to establish an inner peripheral edge 50 radially inwardly of the previously described circle 24 of the annulus 10. Thus, the inner peripheral portion of the wall structure 34 overlaps the press wheel 14 in the area in which the wheel 14 runs tangent to or in contact with the inner circle 24 of the annulus. The two plate structures 32 and 34 are rigidly secured together, with the die blocks 30 therebetween, by fastener means, in this case including an outer circle of bolts 52 as well as an inner circle of bolts 54. Although these bolts are of standard construction, having hexagonal heads, they are shown in FIG. 1 simply as circles in the interests of clarity. Each die block has inner and outer transverse apertures 56 and 58 for respectively receiving the associated bolts.

Just inwardly of the plate 48 is a plate-like ring 60 which has an inner diameter such as to place its inner peripheral edge 62 substantially coincident with the inner peripheral edge 50 on the outer plate 48, and which has an outside diameter considerably smaller than that of the plates 48 and 36 so as to terminate at or lie generally on a circle which may be regarded as shown at 64. Here again, the circle 64 is not complete, since it is interrupted by the provision in the ring 60 of a plurality of V-shaped notches 66, which are substantially identical to the radially innermost ends of the V-shaped notches or recesses 42 in the plate structure 32. The purpose of the notches 66 is of course to receive the inner or lower portions of the die blocks 30 at the sides thereof opposite to the plate structure 32. The cooperating portions of the die blocks and the associated portions of the wall structure 32 and ring 60 that border the respective notches or recesses 42 and 66 establish key means whereby the die blocks 30 are interlocked with the associated wall structures, the securing these blocks in uniformly spaced relation so that they are adequately retained against displacement despite the relatively high forces applied thereto in the pelleting or wafering process. In this particular case, the key means operates to resist forces in circumferential directions; that is, the key means prevents the die blocks from spreading or separating. The bolts 52 and 54 are found to be adequate to hold the blocks against radial displacement.

The ring 60 may be preassembled to the plate 48, being held in place as by a plurality of cap screws 68, the entire annulus 10 being then retained in assembled relation by the bolts 52 and 54. The radially inner ends of the die blocks 30 will of course lie on the circle 24, and the outer ends of the blocks are substantially coincident with the peripheries of the plate structures 32 and 34. This may be regarded as represented generally by the previously described outer peripheral circle 27 (FIG. 1).

The plate 48 of the wall structure 34 may be welded to the housing 16 in the area indicated by the numeral 70, a structural detail which is largely without significance here. Also, the housing and its association with the plate structure 34 has been omitted from FIG. 4 in the interests of clarity.

Since the outside diameter of the ring 60 is materially less than that of the plate 48, it affords only a radially inner portion of the fourth wall of each die opening 12. The remainder of the wall is completed by a wall element 72, here in the form of a rectangular plate-like element having a thickness, as measured in a direction axially of the die structure 10, substantially equal to that of the ring 60. Thus, portions of the ring 60 that are in radial alinement with the respective elements 72 cooperate with these elements to provide what may be regarded as fourth walls of two-part construction, one part for each die opening 12 being represented by the element 72 and the other part being represented by the radially alined portion of the ring 60, which for purposes of description is designated by the numeral 74 in each instance. The radially outer or terminal end of each portion 74 lies roughly on the circle 64, and this terminal end may be squared off on a line perpendicular to the radius through the center of the particular die opening, which will be found to improve somewhat the movable mounting of the element 72, as by hinge means including a hinge pin 76 which may be welded at 78 to the inner terminal end of the element. The hinge pin 76 projects at opposite ends to provide pintles or pivots 80 which are coaxial on an axis parallel to the plane of the wall structure 34. These pintles are received respectively in notches or recesses 82 in the associated die blocks. These notches open toward the inner surface of the plate 48 so that when the plate is assembled it constitutes confining means or a filler element, the notches are closed and the pintles or pivots 80 are adequately retained. This serves as means for mounting the elements 72 so that they are capable of swinging toward and away from the respective opposite walls 44, it being understood of course that the inner surface of each wall element 72 provides the fourth wall of each die opening 12, the other three walls being provided, as previously described, at 44, 46 and 46. The fourth wall represented by each element 72 is therefore adjustable, since the outer end thereof can swing toward and away from its opposite wall 44 for the purpose of varying the cross sectional area of the outlet end of the associated opening 12, which thus enables variation in the density of the material being extruded through the die opening.

Figure 2:
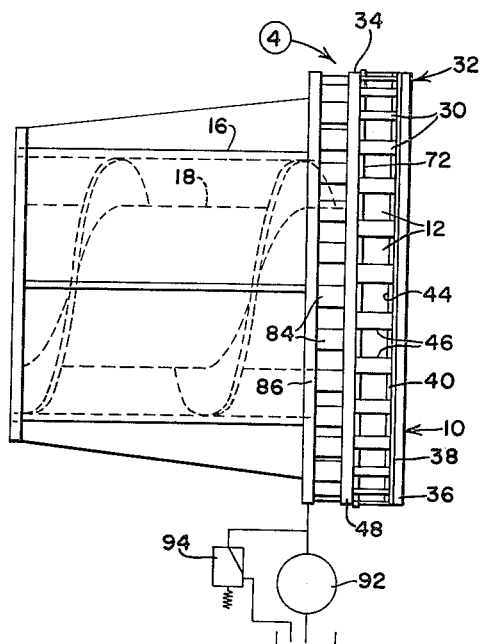
FIG. 2 is an elevation of the same as seen from one side, a portion of the view being illustrated schematically to show a representative hydraulic system.
Figure 3:
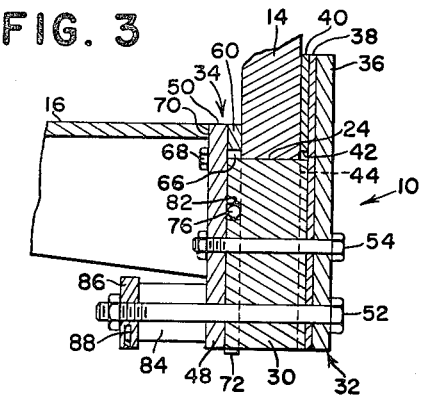
FIG. 3 is an enlarged section as seen generally on the line 3—3 of FIG. 1.

Any suitable means may be provided for adjusting the wall elements 72. That shown here is of the hydraulic type in which a plurality of hydraulic cylinders 84 is arranged in an annular pattern, one cylinder for each element 72. The cylinders are preferably in the form of sleeves having their inner ends abutting and appropriately hydraulically sealed to the outer surface of the plate 48 and having at their opposite ends a hydraulically sealed abutting relationship to a manifold ring 86. The bolts 52 are of sufficient length to pass completely through the ring 86 between cylinders 84 so as to constitute a complete assembly. The manifold ring 86 has therein a continuous fluid passage 88 which communicates at 90 with the individual cylinders 84. Thus, the cylinders are all connected in parallel. Fluid under pressure may be supplied to the manifold passage 88 and interiors of the cylinders 84 by any suitable pump, such as that shown at 92 in FIG. 2. This pump, in association with a relief valve 94, pressurizes the fluid circuit at a predetermined value which is transmitted to the elements 72 by pistons in the respective cylinders which have their rods 96 passing respectively through apertures 98 in the plate 48. These apertures are on the circle on which the bolts 52 lie but of course are interspaced with the bolts so that, although the bolts 52 pass through the die blocks 30, there is room for the piston rods 96 through the apertures 98. The hydraulic system thus provides means for moving the elements 72 inwardly toward their respective opposite walls 44. The material itself serves as means for opposing this movement. Since the hydraulic system just described forms no part of the present invention, but rather forms the subject of copending application Ser. No. 66,874, filed November 2, 1960, it will not be further described here.

It will be seen from the foregoing that the fabricated die structure is of sturdy construction and may be readily produced, assembled and maintained. The interlocking features of the side plates and die blocks have been described, as has the novel mounting of the elements 72, which serve of course as continuations of the radially innermost wall portions 74 as established by the ring 60. In the event of damage to any of the components, the die structure may be readily disassembled for replacement.

Features and advantages other than those enumerated will readily occur to those versed in the art, as will many modifications and alterations in the preferred embodiment disclosed, all of which may be achieved without departure from the spirit and scope of the invention.

What is claimed is:

1. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a rigid wall element disposed across from said one wall and between the opposed faces of the spacers adjacent to and inwardly of the second member and having an inner surface facing toward said one wall to provide at least part of a fourth wall for said opening, said element having first and second ends respectively toward the inlet and outlet ends of the opening; and hinge means mounting said element solely at its first end for movement of its second end toward and away from said one wall for respectively restricting and enlarging said outlet end, said means including a pair of pivots coaxial on an axis closely parallel to said surface and inwardly of the second member and carried respectively by the spacers and connected to the element at the extremity of its first end.

2. The invention defined in claim 1, in which: said pivots are rigidly secured to the first end of the element at the extremity thereof and project oppositely therefrom on said axis, and said spacers are provided respectively with recesses respectively receiving said pivots, said recesses opening outwardly toward said second member and said second member having means thereon overlying said recesses to confine the pivots.

3. The invention defined in claim 1, in which: said first end of the wall element is spaced from the inlet end of the opening in the direction of the outlet end of the opening; and a filler element of a thickness substantially equal to that of the wall element is disposed inwardly of the second member between said first end of the wall element and said inlet end of the opening and has an inner surface forming substantially a fixed continuation of said fourth wall.

4. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a plate-like wall element disposed across from said one wall and between the opposed faces of the spacers adjacent to the second member to provide at least part of a fourth wall for said opening, said element having first and second ends respectively toward the inlet and outlet ends of the opening, said first end being spaced from the inlet end of the opening toward the outlet end of said opening; means mounting the element for movement of its second end toward and away from said one wall for respectively restricting and enlarging said outlet end, said means including a pair of pivots coaxial on an axis parallel to the second member and carried respectively by the spacers and connected to the element at its first end; a filler element of a thickness substantially equal to that of the wall element and disposed between said first end of the element and the inlet end of the opening and having an inner surface forming substantially a continuation of said fourth wall; and key means cooperative between said filler element and the spacers for holding the spaced relation of the spacers to each other.

5. The invention defined in claim 4, including: additional key means cooperative between the spacers and the first side member for further holding the spaced relation of the spacers to each other.

6. The invention defined in claim 1, including: means on said second member engaging and for moving said wall element at least toward said one wall.

7. In a machine of the class described, die structure comprising: a first side plate having an inner surface provided with a pair of recesses spaced apart so that the surface portion between said recesses provides a first wall; a pair of similar blocks mounted on said inner surface in spaced relation to each other and alined with said recesses and respectively having key portions respectively received by said recesses, said blocks respectively having opposed faces meeting and extending away from said first wall to provide second and third walls; a wall element spaced from and opposite to the first wall and extending between the second and third wall to provide at least part of a fourth wall, said walls defining a die opening of quadrilateral section having opposite inlet and outlet ends, and said element being of two-part construction, having a first part extending from said inlet end to a terminal end short of outlet end and a second part extending from said terminal end to said outlet end as a continuation of but separate from said first part; means rigidly securing said first part to the blocks, including cooperative key portions respectively on said blocks and first part; and means mounting the second part on said structure, including a hinge paralleling and adjacent to said terminal end of said first part and mounting the second part for swinging about said hinge toward and away from the first wall.

8. The invention defined in claim 7, in which: said means securing the first part includes a second plate parallel to the first plate and overlying the two parts externally of the die opening and secured to the blocks.

9. In a machine of the class described, die structure comprising: a first side plate having an inner surface providing a first wall; a pair of similar blocks mounted on said inner surface in spaced relation to each other and respectively having opposed faces meeting and extending away from said first wall to provide second and third walls; a wall element spaced from and opposite to the first wall and extending between the second and third walls to provide at least part of a fourth wall, said walls defining a die opening of quadrilateral section having opposite inlet and outlet ends, and said element being of two-part construction, having a first part extending from said inlet end to a terminal end short of said outlet end and a second part extending from said terminal end to said outlet end as a continuation of but separate from said first part, said second part having an end portion parallel to and closely spaced from said terminal end of the first part to provide a gap between the two parts; means rigidly securing said first plate, first part and blocks together as a unitary assembly; and means mounting the second part on said structure, including a hinge lying in and substantially filling said gap and mounting the second part for swinging about said hinge toward and away from the first wall.

10. The invention defined in claim 9, in which: said means mounting the first part includes a second plate parallel to the first plate and overlying the two parts externally of the die opening and rigidly secured to said assembly as a fixed part thereof.

11. The invention defined in claim 10, in which: said blocks respectively have notches therein facing toward and enclosed by said second plate, and said hinge includes pintles on said second part projecting respectively into said notches and confined to said notches by said second plate.

12. In a machine of the class described, die structure comprising: an annulus having uniformly circumferentially spaced similar die blocks arranged in radiating fashion about the longitudinal axis of said annulus and having inner and outer ends lying respectively substantially on inner and outer concentric circles about said axis, said blocks having axially opposite first and second sides respectively coplanar with first and second planes extending radially with respect to said axis and spaced therealong; a first circular plate of smaller diameter than said outer circle and of less axial dimension than the blocks and having a plurality of radially outwardly opening notches equal in number and circumferential spacing to the blocks, said plate disposed coaxially with the annulus with each notch receiving the inner end of one of the blocks at the first side therof, said plate having an outer radial surface coplanar with said first sides of the blocks; a second circular plate coaxially disposed at and overlying the second sides of the blocks and having an inner radial surface interrupted with recesses equal in number and spacing to the blocks and shaped to receive portions of the blocks at said second sides thereof; a third circular plate of a diameter greater than that of the first plate and coaxially disposed axially outwardly alongside the first plate and having an inner radial surface in the aforesaid first radial plane; means rigidly securing the plates and blocks together; a plurality of plate-like elements equal in number to and disposed respectively in and bridging the spaces between blocks at the inner radial surface of the third plate to provide radially outward extensions of the first plate, said elements respectively having inner radial surfaces normally generally coplanar with the inner radial surface of the first plate; and means mounting said elements on said structure for movement toward and away from the inner surface of the second plate.

13. In a machine of the class described, die structure comprising: an annulus having uniformly circumferentially spaced similar die blocks arranged in radiating fashion about the longitudinal axis of said annulus and having inner and outer ends lying respectively substantially on inner and outer concentric circles about said axis, said blocks having axially opposite first and second sides respectively coplanar with first and second planes extending radially with respect to said axis and spaced therealong; a first circular plate of smaller diameter than said outer circle and of less axial dimension than the blocks and having a plurality of radially outwardly opening notches equal in number and circumferential spacing to the blocks, said plate disposed coaxially with the annulus with each notch receiving the inner end of one of the blocks at the first side thereof, said plate having an outer radial surface coplanar with said first sides of the blocks; a second circular plate coaxially disposed at and overlying the second sides of the blocks and having an inner radial surface abutting the blocks at said second sides thereof; a third circular plate of a diameter greater than that of the first plate and coaxially disposed axially outwardly alongside the first plate and having an inner radial surface in the aforesaid first radial plane; means rigidly securing the plates and blocks together; a plurality of plate-like elements equal in number to and disposed respectively in and bridging the spaces between blocks at the inner radial surface of the third plate to provide radially outward extensions of the first plate, said elements respectively having inner radial surfaces normally generally coplanar with the inner radial surface of the first plate.

14. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a plate-like wall element disposed across from said one wall and between the opposed faces of the spacers adjacent to the second member to provide at least part of a fourth wall for said opening, said element having first and second ends respectively toward the inlet and outlet ends of the opening; and means mounting the element for movement of its second end toward and away from said one wall for respectively restricting and enlarging said outlet end, said means including a pintle rigidly secured to the element at its first end and having opposite end portions projecting respectively from the sides of the element into the spacers on an axis parallel to the second member, said spacers having recesses therein respectively receiving said pintle end portions.

15. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a wall element disposed across from said one wall and between the opposed faces of the spacers adjacent to the second member to provide at least part of a fourth wall for said opening, said element having first and second ends respectively toward the inlet and outlet ends of the opening; means mounting said element for movement of its second end toward and away from said one wall for respectively restricting and enlarging said outlet end, said means including a pair of pivots coaxial on an axis parallel to the second member and carried respectively by the spacers and connected to the element at its first end; fastener means between at least one member and the spacers for securing the spacers in place; and key means in addition to the fastener means and cooperative between the spacers and a member for holding the spacers against displacement crosswise of the fastener means.

16. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a wall element disposed across from said one wall and between the opposed faces of the spacers adjacent to the second member to provide at least part of a fourth wall for said opening, said element having first and second ends respectively toward the inlet and outlet ends of the opening; means mounting said element for movement of its second end toward and away from said one wall for respectively restricting and enlarging said outlet end, said means including a pair of pivots coaxial on an axis parallel to the second member and carried respectively by the spacers and connected to the element at its first end; and means for moving said wall element, including a device externally of said second member and having a force-applying part, said second member having an aperture therethrough in register with a portion of said wall element and said force-applying part projecting through said aperture to engage said wall element portion.

17. In a machine of the class described, die structure comprising: first and second spaced apart parallel side members; a pair of spacers disposed between said members and spaced apart to define with said members a die opening having opposite inlet and outlet ends and each spacer having opposite ends respectively at said opening ends; fastener means extending removably through each spacer and the side members crosswise of the end-to-end dimension of the spacer and normally securing said spacer in place; and key means cooperative between each spacer and at least one side member for resisting relative movement between the spacer and the side member in directions toward and away from the other spacer, said key means including cooperative lug and recess elements, and said recess element opening toward one end of the spacer to enable endwise withdrawal of the spacer from between the side members following removal of the associated fastener means while said members remain in place.

18. In a machine of the class described, die structure comprising: first and second spaced apart parallel side members; a pair of spacers disposed between and rigid with said members and spaced apart to define with said members a die opening having opposite inlet and outlet ends, the portion of the first member between said spacers providing one wall for the opening and said spacers respectively having opposed faces extending from said one wall toward the second member to provide two additional walls for the opening; a wall element disposed across from said one wall and between the opposed faces of the spacers adjacent to the second member to provide at least part of a fourth wall for said opening, said element having first and second ends respectively toward the inlet and outlet ends of the opening; means mounting said element for movement of its second end toward and away from said one wall for respectively restricting and enlarging said outlet end, said means including a pair of pivots coaxial on an axis parallel to the second member and carried respectively by the spacers and connected to the element at its first end; and fastener means between at least one member and the spacers for securing the spacers in place.

19. The invention defined in claim 1, in which: said pivots are rigidly secured to the first end of the element at the extremity thereof and project oppositely therefrom on said axis, and said spacers are provided respectively with recesses respectively receiving said pivots, and means is provided for confining said pivots against escape from said recesses.

20. In a machine of the class described, die structure comprising: an annulus having uniformly circumferentially spaced similar die blocks arranged in radiating fashion about the longitudinal axis of said annulus and elongated radially with respect to said axis, said blocks having inner and outer ends lying respectively substantially on inner and outer concentric circles about said axis and having axially opposite first and second flat sides respectively coplanar with first and second planes extending radially of said axis and spaced axially thereof; first circumferential plate means disposed coaxially with the annulus and having an inner radial surface engaging the blocks at the first sides thereof; key means including notches recessed into said inner surface of the plate means, each notch being elongated radially with respect to said axis to extend substantially the full length of a block and said notches being shaped to conform to the blocks and respectively snugly receiving substantially full-length portions of the blocks at said first sides thereof for preventing displacement of the blocks relative to said plate means; second circumferential plate means coaxially disposed at and overlying the second sides of the blocks and having an inner radial surface abutting the blocks at said second sides thereof; and means in addition to the key means and rigidly but removably securing the two plate means and blocks together.

21. Die means for a machine of the class described, comprising: an annulus having opposite sides extending radially witth respect to the longitudinal axis of said annulus and spaced apart along said axis, said annulus further having inner and outer peripheries and a plurality of spacer means disposed between and spacing said sides apart and spaced uniformly circumferentially about and in radiating fashion as respects said axis to provide a like plurality of radiating openings which lead at opposite ends respectively to said inner and outer peripheries, one of said sides comprising a double-thickness plate-like means including an annular axially outer part and a plurality of circumferentially spaced axially inner parts, each opening having related walls comprising an inner part of said one side and an axially opposed portion of the other side and circumferentially opposed radial portions of the associated pair of spacer means; each of the walls that comprises one of said inner parts having a hinge articulately pivoted to the annulus for individual swinging of said inner part toward and away from its associated axially opposite wall, said hinges being axially outwardly covered by said outer part and lying respectively on pivot axes arranged in a circumferential series adjacent to the inner periphery of said annulus.

22. In a machine of the class described, die structure comprising an annulus including a pair of side means extending circumferentially of the annulus and coaxial on the longitudinal axis of said annulus and spaced apart along said axis and a plurality of spacers interposed between the two side means and extending radially relative to said axis and uniformly spaced about same to provide a like plurality of die openings also extending radially relative to said axis, said openings having radially opposite inner and outer ends, each spacer having opposite sides facing respectively in opposite circumferential directions and converging toward said axis to a narrow inner end; means on one of said side means including a plurality of notches equal in number and circumferentially spacing to the spacers and shaped on the order of and arranged respectively to snugly receive said inner ends of the spacers, each notch diverging to an open end facing outwardly as respects said axis so as to enable insertion of a block into its notch radially toward said axis and withdrawal of a block from its notch radially away from said axis while the side means retain their relationship to each other; and means removably securing the spacers to the annulus.

23. The invention defined in claim 22, in which: said means on said one side means includes an annular member coaxial with and rigidly affixed to the side of said side means that faces the other side means, said member having an outer periphery of a diameter less than the outer diameter of said one side means and said notches being provided in said annular member and the open ends of the notches opening at said outer periphery of said annular member.

References Cited by the Examiner

UNITED STATES PATENTS

| 729,149 | 5/1903 | Fenn | 25—12 |
| 2,646,594 | 7/1953 | Field | 18—12 |
| 3,006,272 | 10/1961 | Brady | 100—93 |
| 3,052,192 | 9/1962 | Forth et al. | 107—14 |

WALTER A. SCHEEL, *Primary Examiner.*

ROBERT E. PULFREY, *Examiner.*